United States Patent [19]
Corcoran, Jr. et al.

[11] Patent Number: 5,955,955
[45] Date of Patent: Sep. 21, 1999

[54] DRIVE-BAY MOUNTED COOLING DEVICE

[76] Inventors: William L. Corcoran, Jr., 1703 Coventry La., Glen Mills, Pa. 19432; Gary T. Smith, 256 W. Fifth Ave., Collegeville, Pa. 19426

[21] Appl. No.: 08/796,512

[22] Filed: Feb. 6, 1997

Related U.S. Application Data

[63] Continuation-in-part of application No. 08/349,964, Dec. 6, 1994, abandoned.

[51] Int. Cl.[6] .................................................. G08B 21/00
[52] U.S. Cl. .......................... 340/607; 361/695; 361/697; 361/687; 361/727
[58] Field of Search .............................. 340/607; 361/69, 361/695, 697, 687, 725, 727, 386; 307/66, 125; 351/82

[56] References Cited

FOREIGN PATENT DOCUMENTS 406234320   8/1994   Japan .

Primary Examiner—Jeffery A. Hofsass
Assistant Examiner—Julie B. Lieu

[57] ABSTRACT

A cooling device is disclosed for a computer having a drive bay region with at least one drive bay adapted to receive a drive. The device comprises a case configured to mount within the drive bay of the computer having at least a first and at least a second opening. When mounted within the drive bay, the first opening is exposed to ambient air about the computer and the second opening is disposed within the drive bay region of the computer. The device also comprises at least one air movement device mounted within the case. The air movement device is configured in one of two ways. In a first way, it draws cooling air through the first opening and exhausts substantially all of the cooling air though the second opening into the drive bay region. In a second way, the air movement device draws air through the second opening from the drive bay region and exhausts it through the first opening. A mechanism for supplying power to the air movement device is also provided.

13 Claims, 4 Drawing Sheets

DRIVE-BAY MOUNTED COOLING DEVICE

REFERENCE TO A RELATED APPLICATION

This application is a continuation-in-part of U.S. patent application Ser. No. 08/349,964, filed on Dec. 6, 1994, entitled "Drive-Bay Mounted Computer Cooling Device." now abandoned.

BACKGROUND OF THE INVENTION

1. Field of the Invention

The invention relates generally to a cooling device for a computer. More specifically, the invention relates to a cooling device that mounts in the drive bay of a computer to enhance the computer's ventilation, particularly around the drive bay region.

2. Background

To prevent heat build-up in a computer, often one or more cooling fans are installed. These fans cool the computer, lessening the chance of high temperature computer failure. The fans that come with a computer are satisfactory for cooling the back of the computer enclosure, or "box", however, the applicants determined the need for the cooling of components that reside in the front of the box. In addition to being sources of heat, these components are among the most expensive to replace, therefore, it is advantageous to keep them well cooled.

Due to this high risk of heat damage, it is common for additional fans to be installed in computers. These fans are often mounted internally on cards atop the mainboard, or they may be attached to the structural framework inside of the box. The mainboard mounted fans may have little effect on component temperature since they simply re-circulate the heated air already present within the enclosure. Further, the fans mounted to the structural frame have little effect on the front and/or top area of the computer where disk, CD, and tape drives are located. The present invention addresses both these concerns by drawing in outside air and by cooling the immediate environment of the components.

Additionally, at the instant that power to the computer is turned off, the flow of cooling air ceases immediately. This is also the instant when all of the sensitive components have reached their peak temperature and this allows them to be exposed to an elevated temperature for a considerable time while the heat slowly dissipates through natural conduction and convection. Through the use of a separate power supply, the present invention permits continued cooling of the components after the computer has been turned off.

For the foregoing reasons, there is a need for an easily installed, appealing computer cooling fan that can be mounted on the front or top of the computer to attenuate both operational and post operational heat build up. The present invention fulfills this need among others.

SUMMARY OF THE PRESENT INVENTION

The present invention relates to a cooling device for a computer having a drive bay region with at least one drive bay adapted to receive a drive. The device comprises a case configured to mount within the drive bay of the computer, and having at least a first opening and at least a second opening. When mounted within the drive bay, the first opening is exposed to ambient air about the computer and the second opening is disposed within the drive bay region of the computer. The device also comprises at least one air movement device mounted within the case. The air movement device is configured in one of two ways. In a first way, it draws cooling air through the first opening and exhausts substantially all of the cooling air though the second opening into the drive bay region. In a second way, the air movement device draws air through the second opening from the drive bay region and exhausts it through the first opening. A mechanism for supplying power to the air movement device is also provided.

BRIEF DESCRIPTION OF THE DRAWINGS

The features of the present invention, which are believed to be novel, are set forth with particularity in the appended claims. The invention may best be understood by reference to the following description taken in conjunction with the accompanying drawings, wherein like reference numerals identify like elements, and wherein:

DETAILED DESCRIPTION OF THE PRESENT INVENTION

The present invention relates to a cooling device for a computer having at least one drive bay adapted to receive a drive such as a disk or CD ROM drive. The invention provides means for fluid circulation which inserts into the drive bay and ventilates the computer, particularly the region about the drive bay. More specifically, the device of the present invention comprises a case which is configured to mount within the drive bay of the computer. The case has at least a first opening and at least a second opening. When mounted within the drive bay, the first opening is exposed to ambient air and the second opening is within the drive bay region of the computer. The device also comprises at least one air movement device mounted within the case. The air movement device is configured in one of two ways. In a first way, the air movement device draws cooling air through the first opening and exhausts substantially all of the cooling air though the second opening into the drive bay region. In a second way, the air flow is reversed. The air movement device draws air through the second opening from the drive bay region and exhausts it through the first opening. Power supply means are provided for supplying power to the air movement device .

Figure 1:
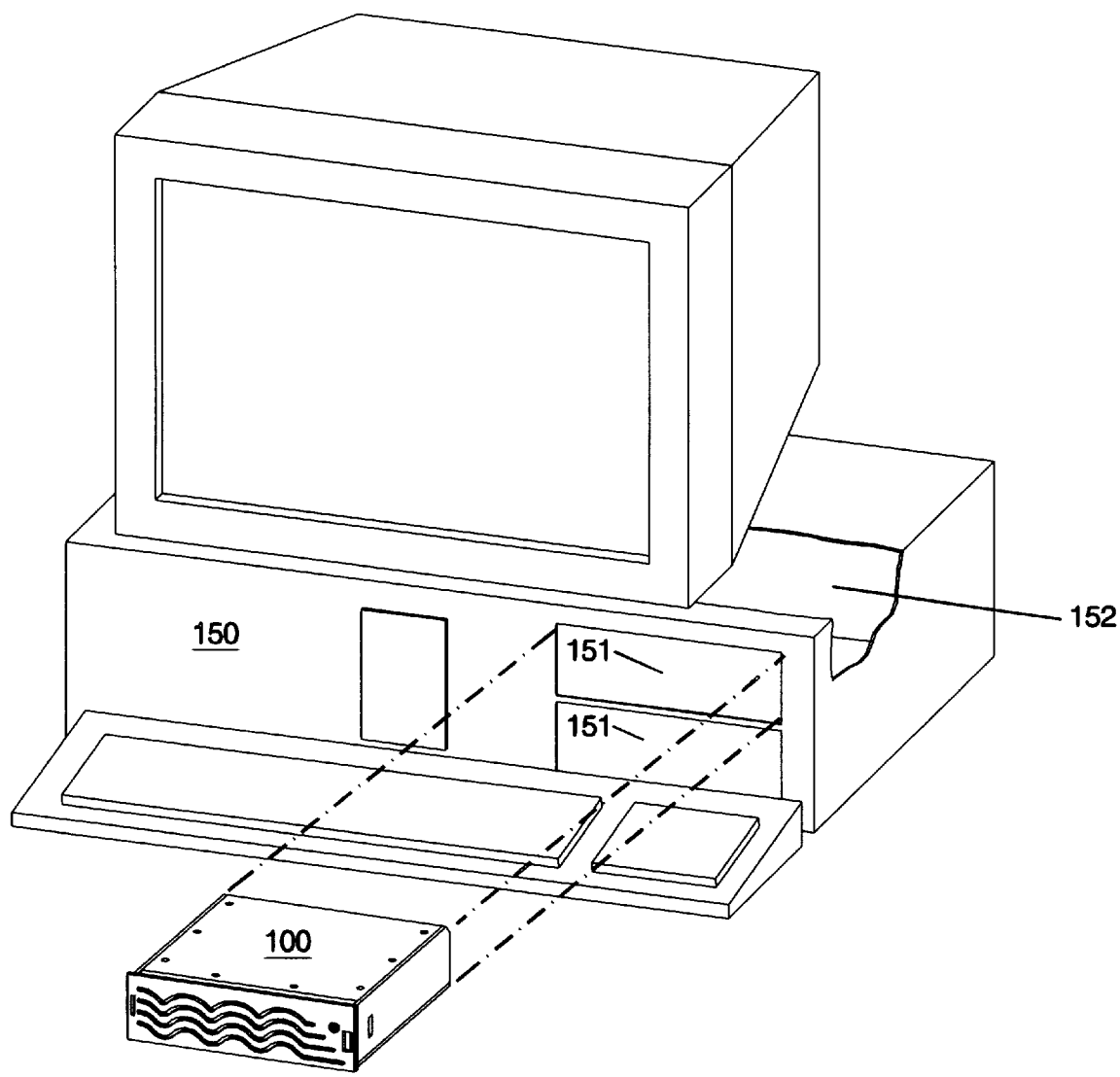
FIG. 1 shows a perspective view of the relationship of the device of the present invention and a conventional computer.

The present invention and its preferred embodiments will now be considered in greater detail in light of the FIGS. 1–4. Referring to FIG. 1, the cooperation of the device 100 and a computer 150 is shown. As shown, the computer has several drive bays 151. The device 100 is configured for insertion into one such drive bay 151. The drive bay region 152 is indicated within the cut-a-way section of the computer 150. As used herein, the drive bay region 152 broadly refers to the region about the drive bay. In many conventional computers, this region is in the front portion of the computer, and in tower encasement it also tends to be toward the top. It should be understood, however, that the size and location of the drive bay region may vary among computers.

Figure 2:
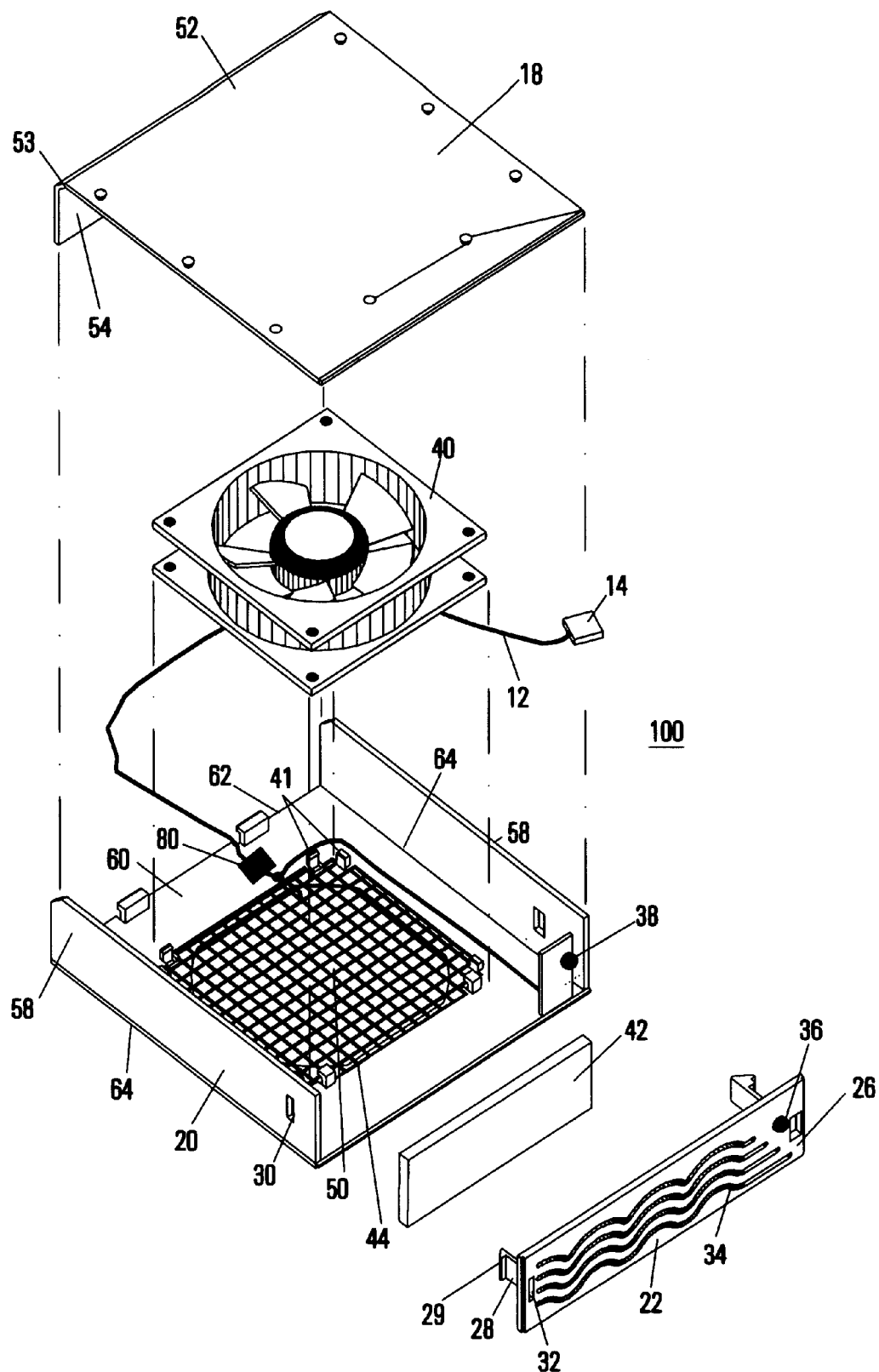
FIG. 2 shows an exploded view of the device.
Figure 3:
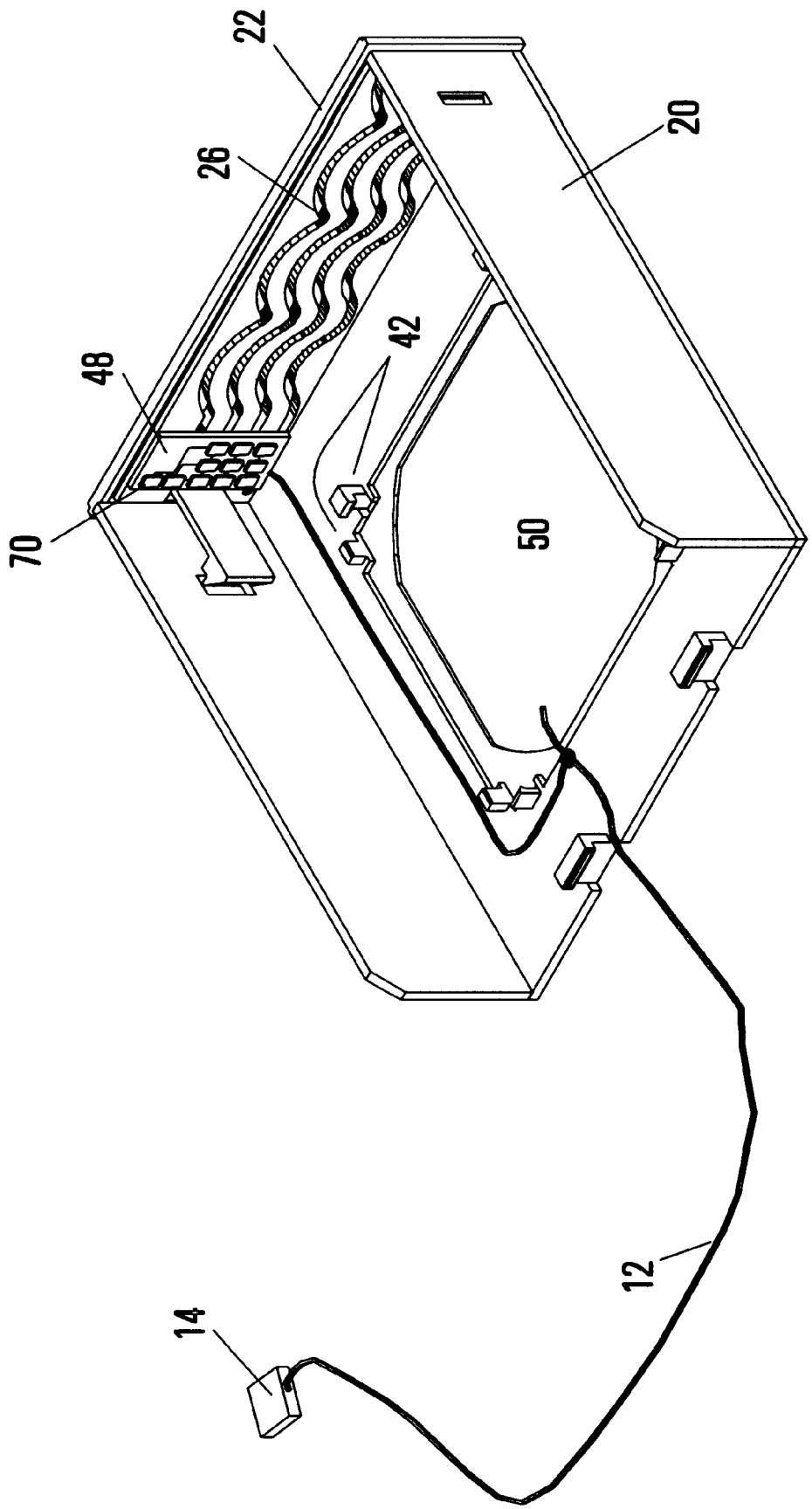
FIG. 3 shows a perspective view of the device having an alarm/timer system.
Figure 4:
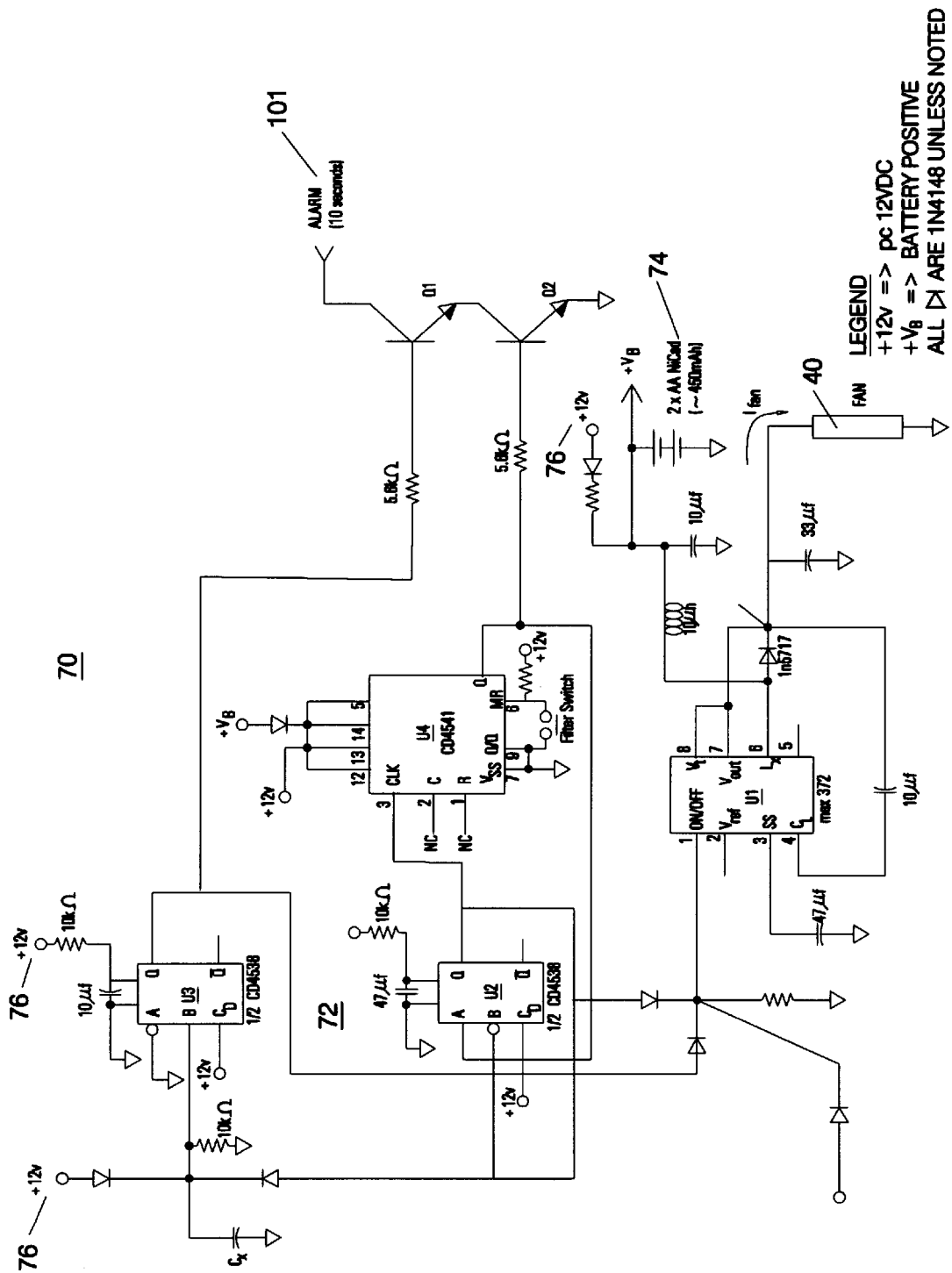
FIG. 4 shows a circuit diagram of a preferred fan timer/indicator circuit.

An exploded view of the device 100 is shown in FIG. 2. The device comprises a case which is adapted to fit into a conventional drive bays. The configuration of such a case is well known in the art and typically resembles a rectangular box. In this particular embodiment, the case comprises several components including a top section 18, a bottom section 20, and a front section 22. It should be appreciated, however, that may variations of case design exist and may be practiced within the scope of the claimed invention.

Top section 18 is comprised of top part 52, angled edge 53, and back part 54. Top part 52 is substantially rectangular and constitutes the top of the case. Back part 54 is substantially rectangular and constitutes the back of the case. The angled back edge 53 is attached at approximately 45 degree angles to top part 52 and back part 54 such that top part 52 and back part 54 are approximately normal to one another. This configuration allows for easier insertion of case 16 into the disk drive.

Bottom section 20 is comprised of sides 58 and bottom part 60. Bottom part 60 has bottom side edges 64 and a bottom back edge 62. Bottom part 60 is substantially the same size as top part 52. Sides 58 are perpendicularly connected to and coextensive with bottom part 60 at side edges 64, and are substantially the same height as back part 54. For connection to the front section, sides 58 have receiving slots 30.

Front section 22 has a front face 24 and a back face 26, and is sized to substantially cover a disk-drive bay opening. Front section prongs 28 are located near the left and right edges of back face 26. Each front section prong 28 extends perpendicularly from back face 26 is fitted with a lip 29 at the end of prong 28 that catches in hole 30 when front section 22 is installed in case 16. Font section 22 snaps into place by sliding it into the front of case 16, back face 26 first, until front section prongs 28 on the back face 26 engage holes 30 in bottom section 20. A prong disengagement hole 32 is located in the right side of front section 22, one inserts a thin, rigid item, such as a small, flat-blade screw driver, into prong disengagement holes 32. Pressure is then applied against prong 28 to disengage the prong from hole 32 by forcing the lipped end of prong 28 away from hole 30.

When assembled, the case has a first opening(s) and a second opening(s). In this particular embodiment, the first opening comprises a pattern of wavy slots 34 running from side to side across a substantial portion of the front section such that adequate fluid communication is possible through the front section without compromising the structural integrity of the case. The narrow slots act as a grading to allow for the passage of fluid but to prevent the insertion of larger objects such as a finger. Aside from slots other grading means can be employed such as small perforations, louvers, vertical or straight horizontal slots and other means known in the art.

The second opening, in this embodiment, comprises a single larger opening 50 disposed in the bottom of the case. The opening 50 is protected by a course mesh grate 44, which may be integral with the bottom section or mounted thereon. The purpose of grate 44 is to prevent the passage of any items into or out of the case, as well as acting as a safety shield for preventing the insertion of foreign objects such as fingers in the air movement device. Although the second opening is disposed in the bottom section of the embodiment depicted in FIG. 2, the second opening, or openings, may be located on the sides or top providing they cooperate adequately with the air movement means. It should be apparent that when the device 100 is installed in a computer, the first opening is exposed to the ambient conditions surrounding the computer, while the second opening is internal to the computer.

The air movement device(s) used in the device 100 may be any conventional air movement device including propeller fans, squirrel cage blowers, bellows, and centrifugal fans. These fans be used individually or in combination. In the preferred embodiment, an axial propeller fan 40 is used as shown in FIG. 2. The fan 20 is mounted vertically and is held in place by fan prongs 41 which are located in the interior surface of the bottom section 20. In other embodiments, the fan 20 may be mounted vertically on the top, or horizontally on the front, back, or sides. The fan 20 may be configured to run in either direction. When the flow of air is directed downward, the fan is configured in the first way such that air is drawn through the first opening and forced downward through the second opening. Conversely, when the flow of air is reversed, the fan is configured in the second way such that air is drawn through the second opening and pressurizes the case. Air finds egress from the pressurized case through the first opening. The fan's configuration may be determined according to the polarity of its power supply, which can be pre-set at the time of manufacture or selected by the user according to his or her particular needs. In the latter case, the device 100 may be equipped with switching means 80 for switching the configuration of the air movement means from the first way to the second way. Such switching means are known in the art.

The air movement device is supplied power via the power supply means. In FIG. 2, power supply means comprises a cord 12 and plug 14. The plug 14 is adapted to interface with the computer's power supply (not shown). Such plugs are well known in the art. In the preferred embodiment, the device also comprises fan timer means for enabling the air movement device to operate for a certain period of time after the computer is turned off. Such a feature is particularly beneficial since, frequently, a computer's fan shuts-off when the computer is turned off even though many computer components will continue to radiate heat. In the typical case where a computer's power supply also shuts down when the computer is turned off, the power supply means also comprises a separate power supply to power the air movement device for a certain period of time after the computer is turned off. In such a case it is preferable to have recharging means operatively connected to the separate power supply and the power supply of the computer such that the separate power supply is recharged when the computer is on.

If the air movement device is configured in the first way such that air is drawn in the first opening and exhausted through the second opening, then it may be preferable to employ filtering means for air entering the computer. Such filter means are well known in the art. In the embodiment depicted in FIG. 2, the filter means comprises an air filter 42 disposed behind the front portion. Air filter 42 is porous enough to allow for relatively unrestricted air flow, while being refined enough to catch dirt and dust. Suitable filters include foam rubber, cheese cloth, paper, sponge, and other conventional filtering materials. In the preferred embodiment, the filter is held in place either by securing it to the front section or by engaging it between the front portion and the case.

In one preferred embodiment of the invention, the device 100 comprises indicator means to indicate when the filter is approaching the end of its useful life. The indicator means may monitor filter life in different ways, for example, it may monitor the time between filer changes or the pressure differential across the filter. In a preferred embodiment, indicator means is designed to detect when the computer has been in use for a predetermined period of time, e.g., 1000 hours. When indicator means determines the computer has been operated for the predetermined period, an alarm will be signaled for a predetermined period of time, e.g., ten seconds, every time the computer is turned on. The alarm indicates that the filter 42 must be cleaned or replaced. The indicator means may be reset by physically replacing the filter 42 while the computer is in use.

In a preferred embodiment of the invention, the fan timer means and indicator means are contained in an alarm/fan system 48 as shown in FIG. 5. The alarm/fan system 48 comprises an alarm and a fan timer/filter circuit which receives power via power cord 12 enters case from the back. The alarm of may be audio, visual, or a combination of the two. In one preferred embodiment, the alarm 101 is a light 38 and the system 48 is mounted on the back face of the front panel. An alarm light opening 36 is located on the side of the front section 22 and aligned with the light 38 allowing the light to be seen from the front of device 100.

The circuit 70 is shown schematically in FIG. 6. Circuit 70 is comprised of a clock circuit 72 (U2 and U3), filter timer (U4), a battery backed-up programmable timer and power supply (U1), and alarm drivers Q1 & Q2. The clock circuit 72 generates a clock signal from one-shot U2 which generates a 50 second period and one-shot U3 which generates a 10 second period. One-shots U2 and U3 are wired 'astable' and therefore generate a 60 second clock signal when power is applied. The 10 second pulse from one-shot U3 supplies the time base for circuit 70.

In the filter timer, the clock circuit 72 drives the programmable timer U4 one count every 60 seconds. After 65,535 clock pulses (1095 hours) of actual computer run time, the output of the timer U4 will toggle, disabling the 50 second one-shot U2 (preventing further counting) and enabling the alarm drivers Q1 & Q2.

The 60 second clock signal is used for the run time for operation of fan 40 after the computer is turned off. When the computer is turned off, the two AA battery cells 74 will power fan 40 for a set period of time. One such time period could be 60 seconds. The two AA battery cells 74 and a step-up voltage converter U1 comprise a DC-DC converter (1.9 volts to 12 volts) that is activated when the computer power is turned off. During normal computer operation, the converter is not operating and all of the fan 40 and re-charge current is derived from the computer's 12 volt supply 76 that gets its electrical power from power cord 12 (not shown).

Obviously, numerous modifications and variations of the present invention are possible in the light of the above teachings. It is therefore understood that within the scope of the appended claims, the invention may be practiced otherwise than as specifically described herein.

What is claimed is:

1. A cooling device for a computer, said computer having a drive bay region with at least one drive bay slot adapted to receive, said device comrising:

a case configured to mount within said drive bay slot of said computer such that said case occupies substantially the entire drive bay slot, said case having at least a first opening and at least a second opening, when mounted within said drive bay, said first opening being exposed to ambient air and said second opening being within said drive bay region of said computer;

at least one air movement device mounted within said case, said air movement device being configured in one of two ways, a first way in which said air movement device draws cooling air through said first opening and exhausts substantially all of said cooling air from said case though said second opening into said drive bay region, a second way in which said air movement device draws air into said case through said second opening from and drive bay region and exhausts it through said first opening; and power supply means for supplying power to said air movement device.

2. The device of claim 1, wherein said air movement device is configured in said first way, and wherein said device further comprises:

air filter means for filtering air, said air filter means being removably mounted to said case.

3. The device of claim 2, further comprising:

indicator means for indicating when said air filter means is near the end of its useful life.

4. The device of claim 3, wherein said indicator means uses a visual alarm.

5. The device of claim 3, wherein said indicator means uses an audio alarm.

6. The device of claim 1, further comprising:

switching means for switching the configuration of said air movement device from said first way to said second way.

7. The device of claim 1, wherein said power supply means is adapted to interface with a power supply of said computer.

8. The device of claim 1, further comprising:

control circuitry to enable said air movement device to operate for a certain period of time after said computer is turned off.

9. The device of claim 8, wherein said power supply means comprises:

a separate power supply to power said air movement device for a certain period of time after said computer is turned off.

10. The device of claim 9, wherein said power supply means comprises:

recharging means operatively connected to said separate power supply and said power supply of said computer such that it recharges said separate power supply when said computer is on.

11. The device of claim 10, wherein said air movement device is an axial fan mounted vertically within said case.

12. In a computer having a drive bay region with at least one drive bay slot adapted to receive a drive, an improvement comprising:

a case mounted within said drive bay slot of said computer such that said case occupies substantially the entire drive bay slot, said case have at least a first opening and at least a second opening, said first opening being exposed to ambient air and said second opening being within said drive bay region of said computer;

at least one air movement device mounted within said case, said air movement device being configured in one of two ways, a first way in which said air movement device draws cooling air from said first opening and exhausts substantially all of said cooling air though said case though said second opening into said drive bay region, a second way in which said air movement device draws air into said case through said second opening from said drive bay region and exhausts it through said first opening; and power supply means for supplying power to said air movement device.

13. The device of claim 12, said device further comprising:

air filter means for filtering air, said air filter means being removably mounted to said case.

\* \* \* \* \*